United States Patent [19]

Lee et al.

[11] 4,323,908

[45] Apr. 6, 1982

[54] RESONANT PURGING OF DROP-ON-DEMAND INK JET PRINT HEADS

[75] Inventors: Francis C. Lee, San Jose; Ross N. Mills; Frank E. Talke, both of Morgan Hill, all of Calif.

[73] Assignee: International Business Machines Corp., Armonk, N.Y.

[21] Appl. No.: 174,335

[22] Filed: Aug. 1, 1980

[51] Int. Cl.³ .............................................. G01D 15/18

[52] U.S. Cl. .................................. 346/140 R; 346/1.1

[58] Field of Search ........... 346/75, 1, 140 IJ, 140 PD

[56] References Cited

U.S. PATENT DOCUMENTS

| | | | |
|---|---|---|---|
| 2,512,743 | 6/1950 | Hansell . | |
| 3,661,304 | 5/1972 | Martinez et al. | 346/75 X |
| 3,852,768 | 12/1974 | Carmichael et al. | 346/75 |
| 4,034,380 | 7/1977 | Isayama | 346/140 PD |
| 4,123,761 | 10/1978 | Kimura et al. | 346/140 PD |
| 4,170,016 | 10/1979 | Geil | 346/140 PD |
| 4,176,363 | 11/1979 | Kasahara | 346/140 PD |

OTHER PUBLICATIONS

Titcomb, S. C., Ink Jet Start–Up and Shutdown, *IBM Technical Disclosure Bulletin,* Nov. 1975, vol. 18, No. 6, pp. 1984–1985.

Chaudhary, K. C., Controlling Drop Velocity and/or Drop Size In An Ink Jet, *IBM Technical Disclosure Bulletin,* Aug. 1978, vol. 21, No. 3, pp. 1212–1213.

*Primary Examiner*—George H. Miller, Jr.

*Attorney, Agent, or Firm*—Henry E. Otto, Jr.

[57] ABSTRACT

The object of this invention is to purge any entrapped air from the ink cavity (17) and nozzle orifice (15) of the print head (10) of a drop-on-demand ink jet printer. Purging is accomplished automatically as a part of the start up operation and also if, during operation, the velocity $V_s$ of the ink droplets (26), as sensed by a sensor (41), drops below a preselected reference value $V_r$.

The print head comprises a tubular piezoelectric transducer (11). The transducer is energized with a series of pulses for a preselected short time period and at a repetition rate substantially equal to a resonant frequency of the ink cavity. This effectively purges any entrapped air from the ink system. Except during purging, the transducer operates asynchronously in drop-on-demand mode in response to discrete binary print signals.

7 Claims, 1 Drawing Figure

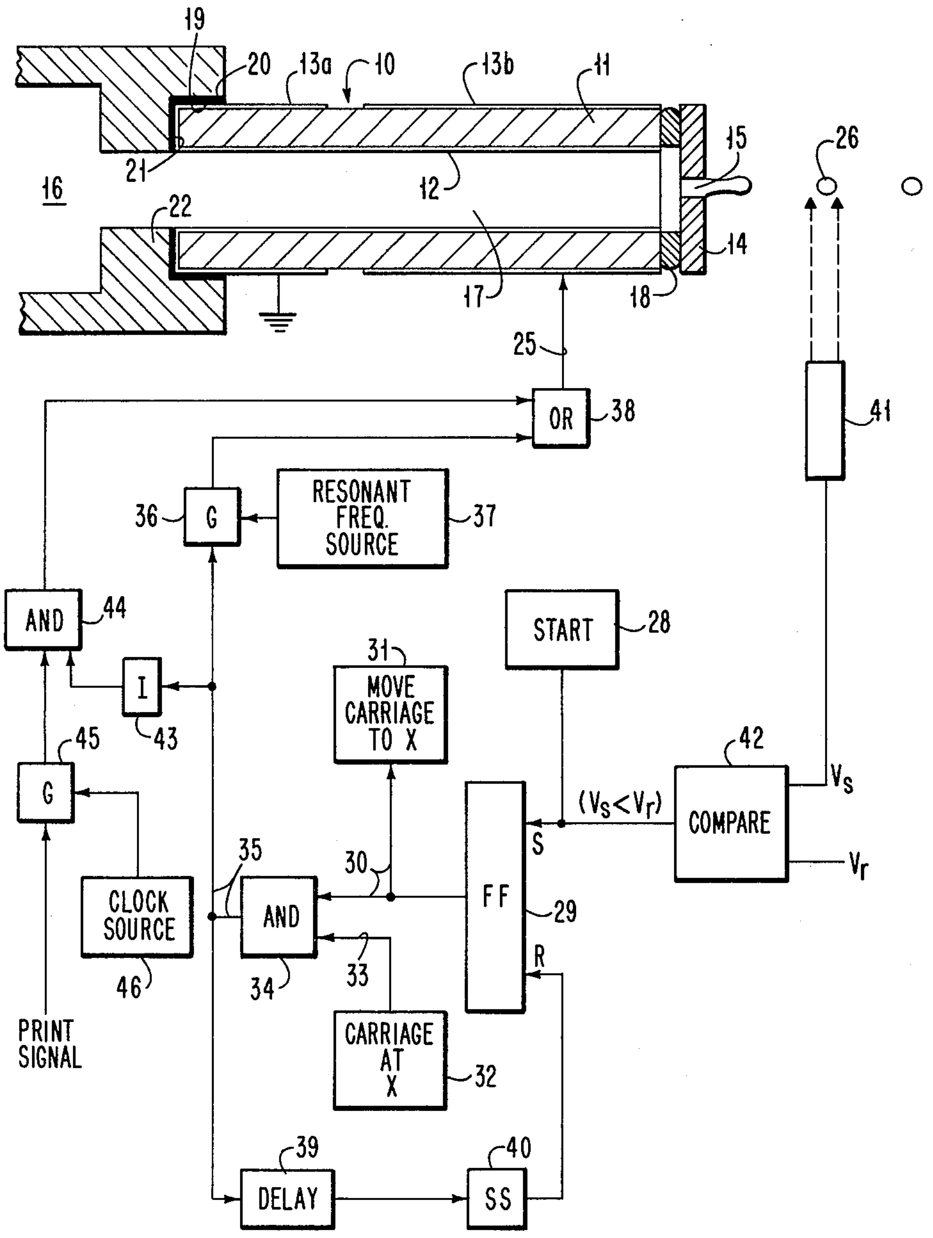
19
20
13a
10
13b
11
15
26
21
16
12
22
14
17
18
25
OR
38
41
RESONANT FREQ. SOURCE
36
G
37
AND
44
START
28
31
MOVE CARRIAGE TO X
I
43
45
42
G
Vs
(Vs<Vr)
COMPARE
S
Vr
35
30
FF
29
CLOCK SOURCE
AND
R
46
34
33
CARRIAGE AT X
32
PRINT SIGNAL
39
40
DELAY
SS

RESONANT PURGING OF DROP-ON-DEMAND INK JET PRINT HEADS

DESCRIPTION

1. Technical Field

This invention relates to priming or purging of ink jet print heads, and more particularly, to an apparatus and method of purging air from the print head cavity and nozzles used in drop-on-demand ink jet printers without requiring a supplemental pressure source.

In drop-on-demand ink jet printers, an ink droplet is ejected each time an electromechanical transducer is asynchronously energized. If there is any air within the ink system, energization of the transducer will cause compression of the air rather than ejection of an ink droplet. It is therefore essential that, prior to a printing operation, the ink cavity and nozzles in the print head of a drop-on-demand ink jet printer be primed or purged to remove any air bubbles that may be present in the ink system, and that the cavity and nozzles be re-primed from time to time to remove any bubbles that may become trapped in the ink system during operation.

2. Background Art

U.S. Pat. No. 3,661,304 describes a binary electrostatic pressure ink jet system in which a piston or the like is employed to introduce "a large amount of momentum" in the form of "a fast rising pressure pulse or shock wave" into the fluid supply passages in the initial phase of start up.

U.S. Pat. No. 2,512,743 describes a synchronous type spray system that operates preferably at a resonant frequency in the MHz range. For start up, the transducer is energized to produce supersonic compressional pressure waves.

U.S. Pat. No. 4,123,761 describes a method of purging a drop-on-demand ink jet head by applying pressure from an elastic balloon receptacle for forcing ink through the head to remove bubbles and impurities from the ink passages.

The November 1975 issue of the IBM Technical Disclosure Bulletin (at p. 1984) discloses an ink jet head transducer with a supplemental oil-can transducer to aid in start up and shut down of ink flow in a pressurized ink jet system. This oil-can transducer is initially driven at a low frequency to create droplets. Then both the ink pressure and drive frequency of the ink jet head transducer are increased. Meanwhile, the drive voltage of the oil-can transducer is decreased and the drive voltage for the ink jet head transducer is increased, until normal pressurized ink jet operation is achieved without assistance from the oil-can transducer. The purpose of this arrangement is to avoid discharge of large globs of ink during start up. It assumes that there is never any air in the ink system, and requires two transducers.

The August 1978 issue of the IBM Technical Disclosure Bulletin (at p. 1212) describes an ink jet printing system in which the velocity and volume of droplets are sensed and maintained at preselected values by a drive servo that functions to control both the pressure of the ink and the ink jet head drive voltage. There is no teaching that droplet velocity be sensed to initiate a purging operation if droplet velocity falls below a preselected value due, for example, to presence of an air bubble in the ink cavity.

U.S. Pat. No. 4,176,363 discloses a drop-on-demand ink jet device wherein a multi-nozzle print head is regularly moved, after each successive predetermined period of time, to a designated position at which ink is expelled from all nozzles to prevent clogging.

U.S. Pat. No. 4,034,380 discloses an ink jet device comprising a sensor to detect oscillation of an electrostrictive member during each pulse and produce a signal indicative of the amount of ink in an ink chamber. When the ink chamber is filled with ink, the oscillation is damped out. However, if the degree of oscillation indicates that bubbles are present in the ink chamber, the magnitude of the pulse is increased to maintain ink ejection at a desired level.

In these and other prior art arrangements known to applicants, means other than a drop-on-demand mode transducer are provided to increase the pressure of the ink to purge air from the ink system.

DISCLOSURE OF INVENTION

In accordance with the invention, during start up a single electroacoustical transducer in the form of a piezoelectric crystal is energized continuously with a series of pulses of at least a predetermined amplitude and a repetition rate equal to at least one resonant frequency of the ink cavity to purge any air entrapped in the ink in said cavity or associated nozzle. After this purging, the transducer is energized in an asynchronous drop-on-demand mode. Thus, purging and asynchronous operation of the ink jet device are achieved without the use of supplemental pressure sources. This purging operation may be repeated at different resonant frequencies. Also, by appropriate programming or other control, the purging may be performed not only prior to a printing operation, but also periodically during a printing operation if, for example, a suitable sensing means detects that the velocity of the ink jet ink has dropped below a preselected value, such as might be caused by an air bubble entrapped in the nozzle.

BRIEF DESCRIPTION OF THE DRAWING

The single FIGURE is a drawing, partly in section and partly schematic, of a drop-on-demand ink jet printing device embodying the invention.

BEST MODE FOR CARRYING OUT THE INVENTION

As illustrated, the drop-on-demand ink jet printing device embodying the invention comprises a print head 10 that includes a tubular electro acoustic transducer 11 disposed between two concentric electrodes 12, 13. A nozzle plate 14, that encloses one end of the transducer, has a nozzle orifice 15 via which printing ink supplied from an ink supply container 16 is expelled from a cavity 17 in the print head.

More specifically, the transducer 11 is in the form of a tubular piezo-electric crystal. Inner electrode 12 makes operative contact with the entire inner surface of the transducer; whereas outer electrode 13 is split into two axially spaced rings 13*a, b* which make operative contact with axially spaced portions of the outer surface of transducer 11. Nozzle plate 14 is secured by nonconductive epoxy 18 to one end of print head 10. The other end of the print head is inset into an annular recess 19 and bonded by conductive epoxy 20 to a shoulder 21 defining one end of an annular barrier 22 in ink supply container 16. The inside diameter of the barrier 22 is preferably the same as the inside diameter of inner electrode 12; however, if preferred, the opening through barrier 22 may be tapered, increasing in diameter toward container 16.

One outer electrode 13*a* is connected to ground, and the other outer electrode 13*b* is connected via a drive line 25 to control circuitry presently to be described. When a direct-current voltage of appropriate polarity and magnitude is applied between the electrodes, transducer 11 will contract radially. The consequent sudden decrease in volume of cavity 17 will create a pressure pulse and cause a droplet 26 to be expelled from the cavity through orifice 15. The amount of ink forced back into container 16 by this pressure pulse will be minimal because of the high acoustic impedance created by the relatively long length and small inside diameter of the transducer.

During start up, as when the operator depresses a start button (not shown), suitable circuitry 28 will provide a signal to set a flip flop 29. This will provide a signal on line 30 for energizing suitable means 31 to move the print carriage (not shown) and hence the ink jet print head 10 to a preselected purging position X (not shown). This purging position is one at which any ink ejected from orifice 15 will not contact the print medium (not shown) to avoid ink smear.

When a micro-switch sensor 32 detects that the carriage is at position X, a signal will come up in line 33. The signals in lines 30, 33 will then be ANDed at 34 to bring up a signal in line 35. This will cause a gate 36 to connect a resonant frequency source 37 via an OR gate 38 and drive line 25 to transducer 11. Source 37 is adjusted to provide a continuous series of pulses at a repetition rate equal to that of a resonant frequency of cavity 17. Supplying pulses at a resonant frequency has been found by actual test to be very effective in purging entrapped air from cavity 17 and nozzle orifice 15.

After a preselected short period of time, as determined by a delay line 39, the signal in line 35 will trigger a single-shot circuit 40 to reset flip flop 29.

It is also desirable that means be provided for automatically purging cavity 17 and orifice 15 under certain conditions during operation. For example, if air becomes entrapped in cavity 17, the efficiency of the piezo-electric crystal 11 will be reduced and this results in a reduction in velocity of the ink droplets 26. Accordingly, a velocity sensor 41 is provided to measure the velocity of droplets 26 as they are ejected from nozzle orifice 15. This sensor differentiates the elapsed time for each droplet to travel through a prescribed small distance. If droplet velocity $V_s$, as sensed, falls below a reference velocity $V_r$, a comparator 42 will provide a signal to set the flip flop 29; whereupon cavity 17 and nozzle 15 will be purged with pulses at cavity resonant frequency until the flip flop is reset in the same manner as previously explained in connection with start up.

When a purging operation ceases by resetting of flip flop 29, the signal will drop in line 35. This will cause an inverter 43 to enable one leg of an AND gate 44. Now, as and when binary data or print signals are asynchronously provided during operation in a drop-on-demand mode, gate 45 will operate to connect a source 46 of clock pulses to AND gate 44. With both legs thus enabled, AND gate 44 will pass these print signals via OR gate 38 and the drive line 25 to transducer 11. The pulses from source 46 are at a much lower frequency than those provided by the resonant frequency source 37. The pulses from source 46 correspond to the rate at which print signals are to be converted into droplets.

Thus, ink droplets will be ejected asynchronously to print on the aforementioned print medium as and when print signals are supplied to gate 45.

By way of example, it has been found that if a tubular piezo-electric crystal driver having an outside diameter of 0.050", an inside diameter of 0.030", a tube length of 0.800" and an orifice of 0.002" diameter is driven at a repetition rate of 69 KHz and a peak-to-peak voltage of 10 volts, a resonating acoustic wave is generated that is strong enough to eject a continuous jet stream from the nozzle and effectively dislodge all entrapped air. By contrast, the frequency of pulses from the clock source 46 would be of the order of less than 10 KHz for a typical ink viscosity of 5–10 centipoise.

It is to be noted that acoustic waves have generally limited band width (typically of the order of several KHz). It is therefore important that the resonant frequency source 37 be tuned as accurately as possible to hit a precise resonant frequency of the cavity. Cavities of irregular shape will have several resonant frequencies. Excitation at several resonant frequencies in an alternating fashion has been found to effectively dislodge even very large air bubbles.

It will be understood that, if desired, resonant purging of the cavity 17 and nozzle 15 could be effected after fixed predetermined periods of operation. This could be achieved by providing a timing circuit (not shown) that would time the period of operation and periodically provide a signal that would set flip flop 29.

While the invention has been shown and described with reference to a preferred embodiment thereof, it will be understood by those skilled in the art that the foregoing and other changes in form and detail may be made therein without departing from the spirit, scope and teaching of the invention. Accordingly, the apparatus and method herein disclosed are to be considered merely as illustrative and the invention is to be limited only as specified in the claims.

We claim:

1. A method of purging air from an ink-containing cavity in the print head of a drop-on-demand ink jet device, comprising the steps of:

providing a transducer in operative relationship with ink in the cavity, energizing the transducer continuously, during purging time, with a series of pulses of at least a predetermined amplitude without application of supplemental pressure to the ink, said series of pulses being applied for a preselected period of time and at a repetition rate substantially equal to at least one resonant frequency of the cavity to purge any entrapped air from the cavity, and thereafter, during printing time, energizing the same transducer with asynchronous pulses in a drop-on-demand mode at a frequency lower than any such resonant frequency.

2. The method according to claim 1, including the step of moving the print head to a preselected position during start up to perform the purging operation.

3. The method according to claim 1, including the step of sensing the velocity of ink droplets ejected from a nozzle communicating with the cavity in the print head, and moving the print head to a preselected position to perform the purging operation whenever the ink droplet velocity drops below a preselected value.

4. The method according to claim 1, including the step of moving the print head to a preselected position to perform the purging operation during start up and periodically after preselected periods of subsequent operation in the drop-on-demand mode.

5. A drop-on-demand ink jet device comprising an ink jet print head having:

a cavity for receiving ink, nozzle means providing an exit from said cavity, a transducer in operative relationship with the ink in said cavity, means for energizing said transducer continuously with a series of pulses of at least a predetermined amplitude for a preselected period of time at a repetition rate substantially equal to at least one resonant frequency of said cavity to purge any entrapped air from said cavity, and means for energizing said transducer after said period with asynchronous pulses in a drop-on-demand mode to expel ink droplets asynchronously from said nozzle means, whereby purging and asynchronous operation of the device are achieved using the same transducer and without requiring a supplemental source of pressure.

6. An ink jet device according to claim 5, including:

means for sensing the velocity of the ink droplets ejected from said nozzle means, and means for moving the print head to a preselected position to perform the purging operation whenever ink droplet velocity drops below a preselected value.

7. An ink jet device according to claim 5, including:

means for moving the print head to a preselected position to perform the purging operation periodically after preselected periods of operation to insure the cavity and nozzle means are maintained free of entrapped air.

* * * * *